INVENTOR
ALEXANDER J. ZANNI

BY Richard L. Stephens

Sept. 13, 1966            A. J. ZANNI            3,271,904

PRECISION WIRE SEVERING APPARATUS

Filed Feb. 13, 1964            3 Sheets-Sheet 2

United States Patent Office 3,271,904
Patented Sept. 13, 1966

3,271,904
PRECISION WIRE SEVERING APPARATUS
Alexander J. Zanni, 19 Bradley St., Binghamton, N.Y.
Filed Feb. 13, 1964, Ser. No. 344,686
6 Claims. (Cl. 51—98)

My invention relates to severing apparatus, and more particularly, to improved apparatus for cutting fine metallic wires, tubing, and like filamentary articles, to desired lengths. A variety of precision instruments and mechanisms include lengths of fine wires, tubes and thin rods as components. Due to the small diameter of many such parts, and due to the flexibility of some small-diameter wires or tubes which must be furnished in designated lengths, it has in general been difficult to sever such pieces accurately to desired lengths without bending or kinking the wire, without leaving burrs or teats at severed joints, and in the case of hollow tubing, without kinking the tubing or leaving burrs at the severed joints. Where fine wires or rods are used as electrical contacts, it is highly desirable for purposes of reliable electrical contact operation that the severed ends be as nearly flat as possible. Since such contacts often are formed of precious metal, such as gold, it is desirable that such contacts be produced readily without spoiling a number of lengths in order to obtain a satisfactorily cut piece. In many instruments and machines, one or more ends of such fine wires or rods must be butt-welded to other devices, and the provision of flat ends without burrs or teats greatly facilitates reliable welding. In the case of small hollow tubing, the absence of kinks and burrs is necessary in order that fluid flow through the tubing not be restricted, and again, the provision of a flat severed end facilitates welding or otherwise affixing the ends of the tubing. While a variety of known devices are readily available for use with larger diameter wire, rods and tubes, most of them have proven to be highly unsatisfactory for precision severing of small-diameter wire, rods and tubes. The present invention is primarily concerned with wires, rods and tubes of very small diameters, down to about .003 inch. While the principles of the invention may be used to sever longer diameter objects, a variety of other satisfactory devices are already available for wires, rods and tubes greater in diameter than say, ¼ inch. The rods, tubes and wires typically must be cut into various lengths, from very short lengths of about ⅛ inch, up to great lengths of several feet or more. Plier-type wire-cutting devices, for example, necessarily deform the wire ends on both sides of a cut. Reciprocating saw blade devices which operate with hack-saw principles tend to bend the wire near the point being cut and also leave undesirable burrs or teats. Tubing cutters which rotate around the tubing and score it, in the manner of ordinary pipe cutters and thin-wall cutters, are unavailable for small diameters, since their rotation around fine tubing obviously could not be controlled manually without kinking the tubing, and secondly, the gradual tightening of such cutters which is necessary to gradually score through the tubing cannot be controlled sufficiently accurately when cutting small tubing, since the extremely small movements required to clamp down upon the tubing without crushing it cannot be easily detected by the eye. While such defects of plier-type cutting devices and hack-saw type devices, similar defects of various other devices on occasion can be overcome by mounting and chucking the wire in a metal cutting lathe, such a method is tedious and time-consuming, and does not readily lend itself to high-speed production. Some small pieces, of course, cannot be accurately positioned in and out upon a lathe. Furthermore, such use of a lathe is uneconomical if a suitable but much less expensive machine were available.

Thus it is a primary object of the present invention to provide an improved severing machine capable of cutting small-diameter wires, tubes and rods to desirable lengths without kinking or bending same, and without leaving burrs or teats on or adjacent the severed ends.

It is another object of the invention to provide a device of the type mentioned which can be operated rapidly and accurately by an unskilled operator, so that small wires, rods and tubes may be cut to desired lengths readily without error.

Other objects of the invention will in part be obvious and will in part appear hereinafter.

The invention accordingly comprises the features of construction, combination of elements, and arrangement of parts, which will be exemplified in the construction hereinafter set forth, and the scope of the invention will be indicated in the claims.

For a fuller understanding of the nature and objects of the invention reference should be had to the following detailed description taken in connection with the accompanying drawings, in which.

Figure 1:
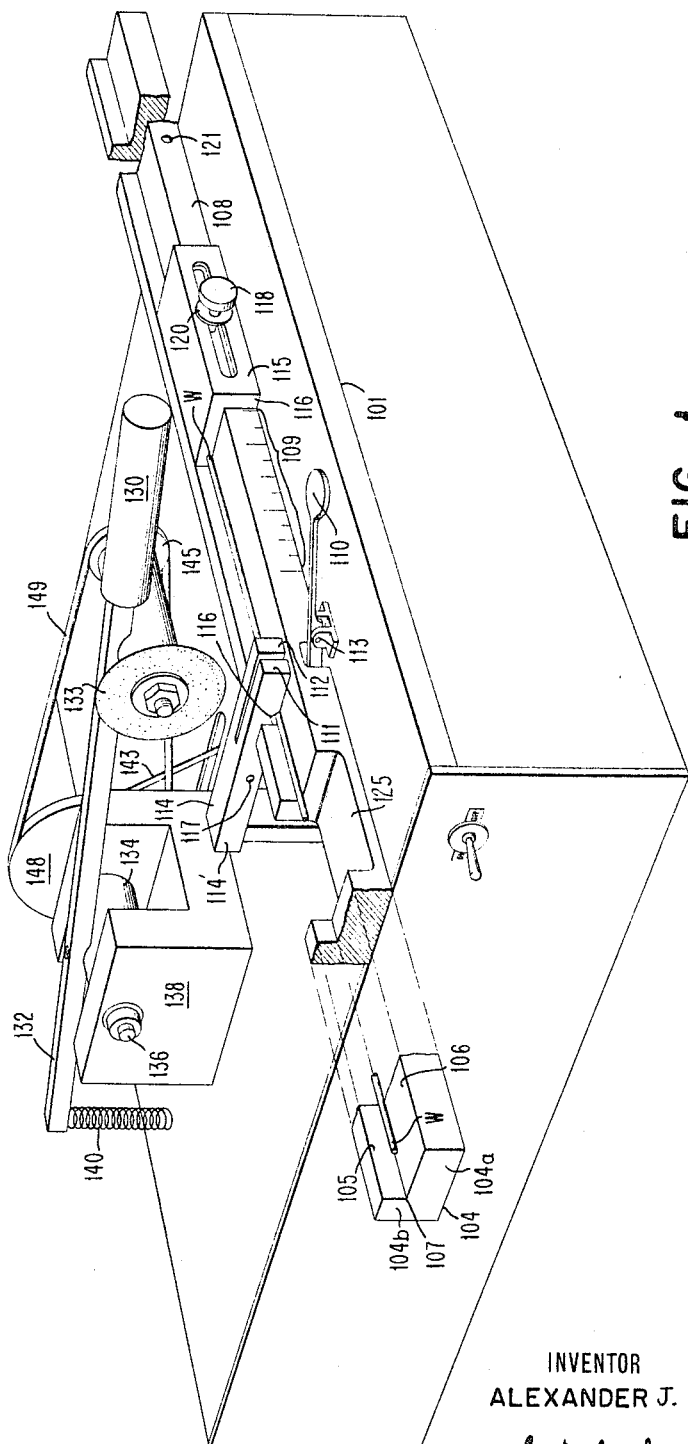
FIG. 1 is an isometric view of a preferred form of wire-severing machine constructed in accordance with the invention.

Referring to FIGS. 1–4, the cutting machine of the present invention includes a rectangular base plate 101 mounted on a hollow box structure to provide a clearance space below base plate 101. Fixedly attached to base plate 101 and extending thereacross, and projecting outwardly from each side of base plate 101 is an angle-shaped cutting block or shelf 104 having a horizontal leg portion 104a and a vertical leg portion 104b. Vertical face 105 of vertical leg 104b and horizontal face 106 of horizontal leg 104a meet at a corner 107, and a wire W to be severed extends along cutting block 104 nested in corner 107, clamped against both vertical face 105 and horizontal face 106. Wire to be cut is fed rightwardly as viewed in FIG. 1 along cutting block 104 under bars 111, 112 of yoke 114 until it strikes laterally adjustable stop block 115. Clamp knob 118 serves as a set screw, a shaft portion of knob 118 threadedly engaging horizontal arm 104a of cutting block 104, so that tightening of clamp knob 118 presses washer 120 against adjustable stop 115, thereby fixing the lateral position of adjustable stop block 115 along cutting block 104. As is evident from FIG. 1, the vertical face of stop block 115 is slotted to allow a range of lateral adjustment of stop block 115. The length of each section of wire to be cut is determined by adjustment of stop block 115 relative to the slot between guide bars 111, 112. The front vertical face 108 of horizontal leg 104a may be inscribed with scale marking such as shown at 109, and then edge 116 of stop block 115 may be read against such a scale to determine the adjustment of stop block 115 to cut wires to a desired predetermined length. In order to allow a greater range of different lengths of wire to be cut, a plurality of further threaded holes (typified by hole 121) may be provided along cutting block 104, so that stop block 115 and set screw clamp 118 may be positioned at different discrete places along block 104, and the slot in block 115 may be used to allow continuous adjustment between the discrete ranges of positions dictated by the threaded holes in angle block 104.

Figure 4:
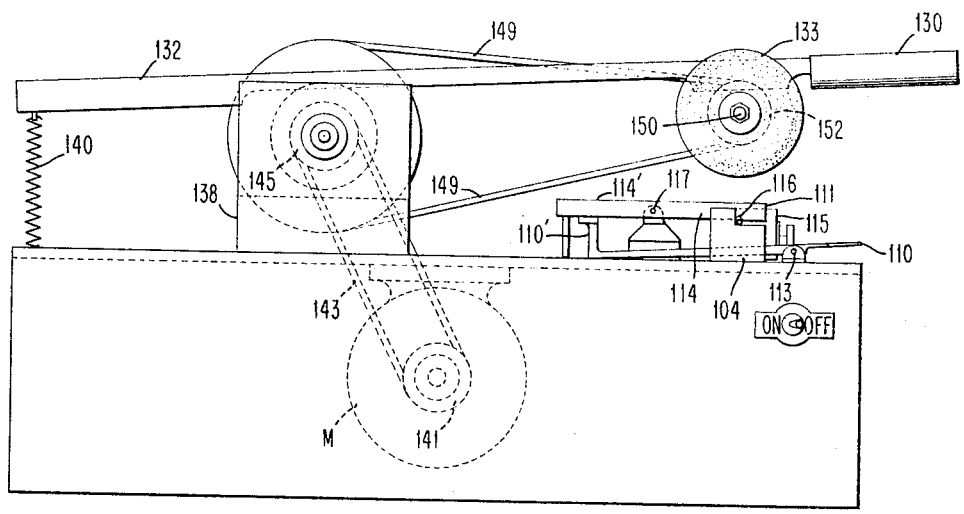
FIG. 4 is an opposite end view taken as shown by lines 4—4 in FIG. 2.

As clearly shown in FIG. 1, a portion of cutting block or shelf 104 is cutaway, as shown at 125, to allow easy manual gripping of wire W as it lays in corner 107 of block 104, thereby allowing wire W to be manually manipulated either along the length of block 104 and adjusted to lie shnugly in corner 107. In order to urge the portion of wire W being severed vertically against face 106 of block 104 and horizontally against face 105, a lever system is provided, as best seen in FIG. 4. Downward pressure on lever 110 causes lever 110 to pivot about pin 113, so that the inner end 110' of lever 110 raises the inner end 114' of lever 114 upwardly. Lever 114 pivots about pin 117, so that outer or yoke ends 111, 112 of lever 114 move downwardly, urging wire W downwardly against face 106 and inwardly against face 105, ends 111 and 112 being provided with an inverted V-groove as shown at 116, so as to present to wire W a pair of surfaces which are oblique to both surfaces 105 and 106 of shelf 104.

When a length of uncut wire has been nested in corner 107 and translated along block 104 until it strikes stop 115, the actual severing is accomplished by moving control handle 130 downwardly. Downward motion of control handle 130 causes a rapidly-rotating abrasive disc 133 to be lowered in a slot between legs 111, 112 of lever 114 to contact the wire and sever it.

Control handle 130 is attached to arm 132, which is pivotally mounted by being fixedly attached to rotatable collar 134. Collar 134 is rotatably journalled on shaft 136, which extends through the arms of yoke block 138, the latter being rigidly affixed to base 101. The rear end of arm 132 is attached to base 101 by tension spring 140, so that arm 132 is normally urged in a counter-clockwise direction as viewed in FIG. 1, thereby tending to lift cutting wheel 133 away from the wire. Although rotatable with respect to shaft 136, it is important that collar 134 not be slidable along the axis of shaft 136, and hence yoke block 138 is arranged so as to allow no such translation. Also, relatively large diameter bearings are utilized to carry collar 134 on shaft 136, all to the end that collar 134 be strictly constrained solely to rotate about the axis of shaft 136. As control handle 130 is pushed downwardly, against the force of spring 140, powered abrasive disc 133 passes between guide arms 111, 112 of lever 114 and engages the wire. In a typical embodiment of the invention abrasive disc 133 comprises a thin (.003 to .025 inch) disc having a diameter of 1½ inches, connected to rotate at 5000 r.p.m.

In order to provide clean severing of the wire by means of the rotating abrasive disc 133, it is important that the plane of rotating disc 133 move strictly perpendicularly to the axis of wire W. In order that great amounts of force not be required to move handle 130 downwardly as disc 133 cuts through the wire, it is desirable that arm 132 be quite long between the pivot point (shaft 136) and disc 133 in order to gain the torque advantage of a long lever arm. On the other hand, the longer such lever arm distance is made, the more lateral play will result from a given amount of play in collar 134 on shaft 136; and the more lateral play will result from bending of arm 132 in a lateral direction; and thus a compromise length of arm 132 between its pivot point and disc 133 must be selected. In order to allow precise and controlled downward movement of disc 133 through the wire, with a minimum of lateral motion of disc 133 and a minimum bending of the wire due to sudden forces on the wire, it is quite important that vibrations from the drive motor of the machine not be directly applied to disc 133; and for precise control of handle 130 and rod 132 to allow precise downward feeding of disc 133, it is highly advantageous that arm 132 not be subject to undue vibration. To these ends the invention incorporates a novel drive arrangement in which the drive motor M is separated from cutting disc 133 by a pair of belt drives operating in series, and in which the drive motor is not directly carried on pivotable arm 132.

Figure 2:
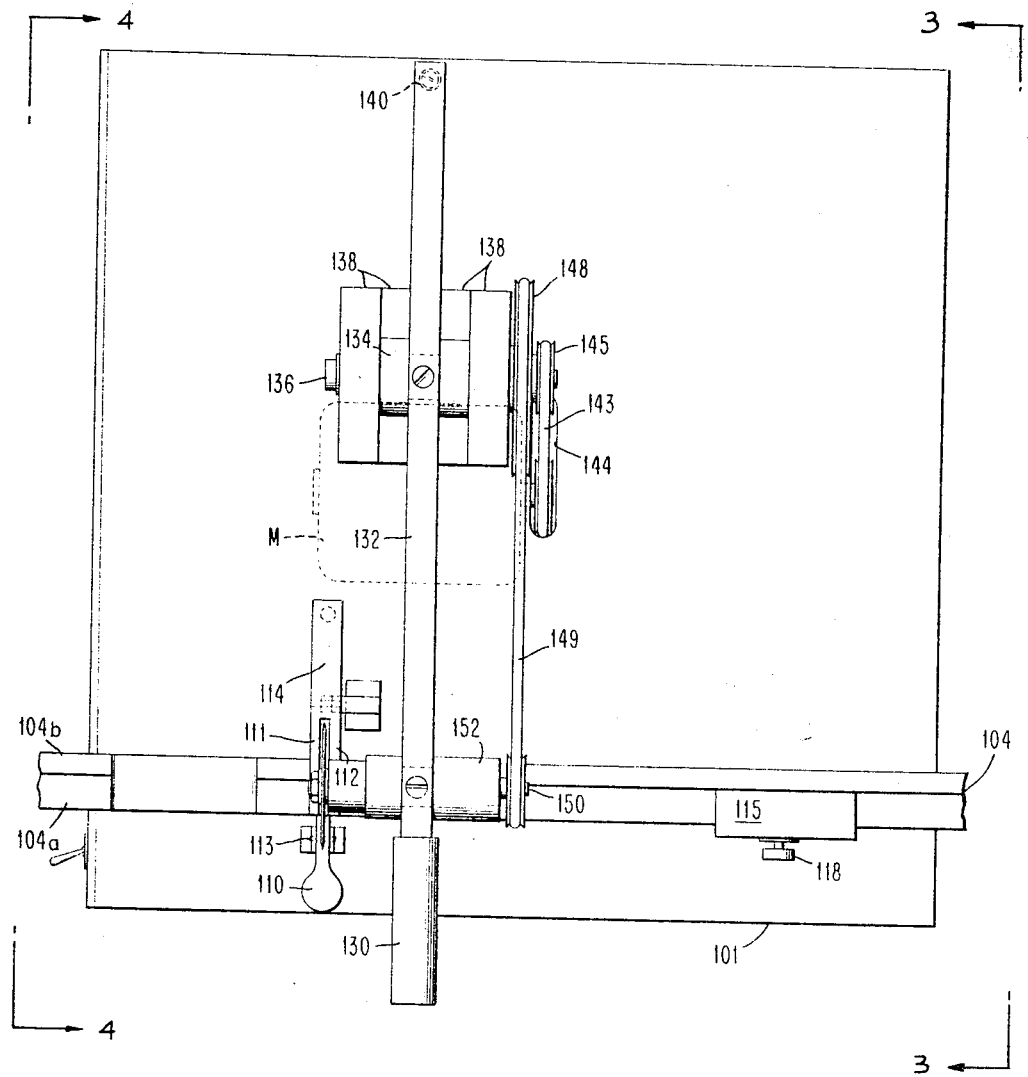
FIG. 2 is a plan view of the apparatus of FIG. 1.
Figure 3:
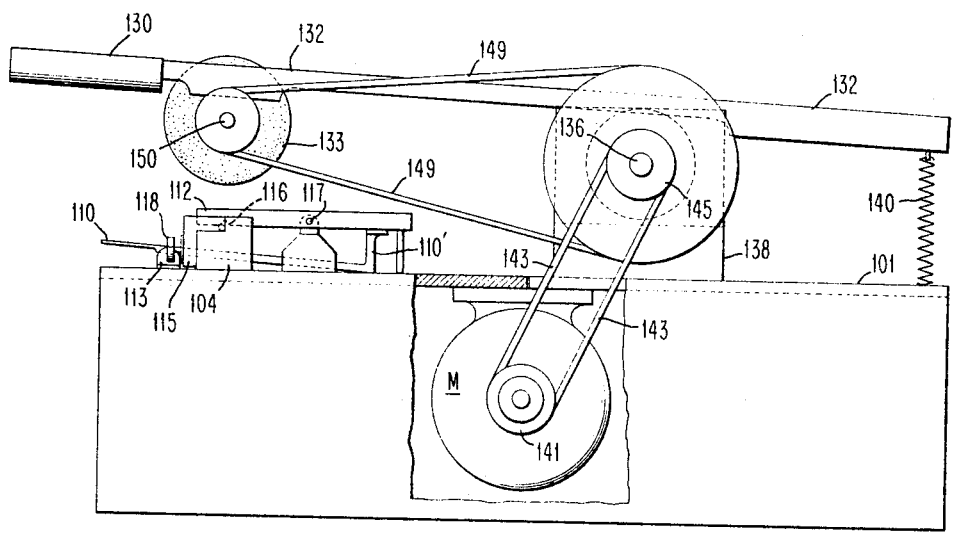
FIG. 3 is one end view taken as shown by lines 3—3 in FIG. 2 with certain parts shown cutaway for sake of clarity.

As best seen in FIGS. 2–4, drive motor M is mounted on the underside of base plate 101. Pulley 141, belt 143 (passing through slot 144 in base plate 101) and pulley 145 apply the motor drive power to shaft 136, pulley 145 being mounted on shaft 136, and hence shaft 136, which preferably is mounted in ball bearings, is driven at a speed proportional to the speed of motor M. Pulley 148, which is also mounted on shaft 136 (and which may comprise merely a different groove of pulley 145), connects the motive power of drive motor M via belt 149 to disc shaft 150, which is journalled in bearing cylinder 152 fixedly attached to and carried on pivot arm 132. Because arm 132 pivots about the axis of shaft 136 as control handle 130 is moved upwardly or downwardly, it will be seen that motion of control handle 130 neither tightens nor loosens belt 149, so that no idler pulleys or the like are required, and hence the total belt tension and drive torque between motor M and disc 133 remain constant irrespective of the up-down motion of control handle 132. Because the motor drive is connected to cutting wheel 133 through a first flexible belt 143 to pulley 145, and because pulley 148 is then connected to cutting wheel 133 via a second flexible belt drive, much of the vibration of drive motor M is not transmitted to either control arm 132 or cutting wheel 133. The mounting of motor M in fixed relation to the machine base instead of on the pivot arm 132 as has been done in various prior art devices, also makes the pivot arm a considerably lighter, more easily-controlled member, having much less inertia. Because the moment of inertia of arm 132 about the axis of shaft 136 is much less than if a motor were required to be carried on arm 132, the transient reaction forces between wire W and disc 133 as the disc cuts through inhomogeneities in the wire will be much less, since sudden increases in such forces will tend to translate arm 132 and disc 133 away from the wire much more readily, due to the lower moment of inertia. An furthermore, the remote and relatively-fixed location of the motor also minimizes sudden forces between cutting disc and work which result from motor shaft rotation not being perfectly balanced, i.e. being "out-of-round." While motor M is shown mounted directly on the underside of base plate 101, it should be understood that a vibration-absorbing or vibration-isolating mounting of any effective well-known type is preferred between motor M and base 101 in order that a minimum amount of the vibration of motor M be mechanically coupled to base 101. It is also desirable that collar 134 and shaft 136 be journalled in block 138 so as to provide minimum lateral translation and minimum canting of arm 132, as mentioned above.

It will thus be seen that the objects set forth above, among those made apparent from the preceding description, are efficiently attained, and since certain changes may be made in the above construction without departing from the scope of the invention, it is intended that all matter contained in the above description or shown in the accompanying drawing shall be interpreted as illustrative and not in a limiting sense.

Having described my invention, what I claim as new and desire to secure by Letters Patent is:

1. Apparatus for severing thin cylindrical articles into desired lengths, comprising, in combination: a base; a work-piece supporting shelf rigidly attached to said base, said shelf having a pair of mutually perpendicular plane surfaces which intersect to form a corner; a pivotally-mounted yoke means supported on said base on one side of said shelf and a clamp handle situated on the other side of said shelf; lever means extending below said shelf to connect said clamp handle to said yoke means, whereby movement of said clamp handle is operative to urge said yoke means toward said shelf, thereby to fixedly clamp into said corner a cylindrical work-piece located in said corner; bearing means mounted on said base and a first shaft journalled in said bearing means, the axis of said first shaft extending parallel to both of said plane surfaces; a collar rotatably mounted on said first shaft and restrained against movement along the axis of said first shaft; a rigid arm fixedly attached to said collar to pivot about the axis of said first shaft, said arm extending within a plane perpendicular to the axis of said first shaft and perpendicular to said plane surfaces of said shelf from said collar past said shelf and terminating in control handle means; a bearing cylinder mounted on said arm and carrying a second shaft having its axis parallel to that of said first shaft; a motor mounted on said base; first flexible belt drive means connecting said motor to drive said first shaft; second flexible belt drive means connecting said first shaft to rotate said second shaft; and an abrasive disc mounted on said second shaft, whereby said control handle means may be moved to cause said abrasive disc to engage a work-piece clamped in said corner.

2. Apparatus according to claim 1 in which said yoke means includes first and second legs adapted to clamp against said work-piece at first and second spaced locations, and in which said abrasive disc is adapted by movement of said control handle means to pass between said legs of said yoke to sever said work-piece between said first and second spaced locations.

3. Apparatus according to claim 1 having spring means connected to said rigid arm and adapted to urge said arm in a direction to move said abrasive disc away from said work-piece.

4. Apparatus according to claim 1 having stop means reciprocable along said shelf and means for locking said stop means at a desired location along said shelf.

5. Apparatus according to claim 1 in which said yoke means is provided with a surface oblique to both of said plane surfaces of said shelf.

6. Apparatus for severing thin cylindrical work-pieces into desired lengths, comprising, in combination: a base; a work-piece supporting shelf rigidly attached to said base; means mounted on said base for fixedly supporting a first shaft in a position fixed with respect to said base; an arm mounted on said first shaft for pivotal movement about said first shaft; a spindle carried on said arm; a rotatable cutting tool mounted on said spindle; a motor mounted on said base; first flexible belt drive means connected between said motor and said first shaft; and second flexible belt drive means connected between said first shaft and said spindle.

References Cited by the Examiner

UNITED STATES PATENTS

| | | | |
|---|---|---|---|
| 1,052,844 | 2/1913 | Philippi | 51—99 |
| 2,315,090 | 3/1943 | Dreher | 51—98 |
| 2,418,737 | 4/1947 | Talboys | 51—98 |
| 2,814,913 | 12/1957 | De Witt | 51—98 X |
| 3,095,673 | 7/1963 | Born et al. | 51—98 |

LESTER M. SWINGLE, *Primary Examiner.*